(12) United States Patent
Simske et al.

(10) Patent No.: US 10,216,721 B2
(45) Date of Patent: Feb. 26, 2019

(54) SPECIALIZED LANGUAGE IDENTIFICATION

(71) Applicant: Hewlett-Packard Development Company, L.P., Houston, TX (US)

(72) Inventors: Steven J Simske, Fort Collins, CO (US); Marcelo Riss, Santa Maria (BR); Marie Vans, Ft. Collins, CO (US); Malgorzata M Sturgill, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/515,933

(22) PCT Filed: Sep. 30, 2014

(86) PCT No.: PCT/US2014/058391
§ 371 (c)(1),
(2) Date: Mar. 30, 2017

(87) PCT Pub. No.: WO2016/053314
PCT Pub. Date: Apr. 7, 2016

(65) Prior Publication Data
US 2017/0300471 A1    Oct. 19, 2017

(51) Int. Cl.
*G06F 17/27* (2006.01)
*G06F 17/30* (2006.01)
(52) U.S. Cl.
CPC ........ *G06F 17/275* (2013.01); *G06F 17/2765* (2013.01); *G06F 17/30663* (2013.01); *G06F 17/30684* (2013.01)

(58) Field of Classification Search
None
See application file for complete search history.

(56) References Cited

U.S. PATENT DOCUMENTS

| 5,995,955 | A | 11/1999 | Oatman |
| 6,205,456 | B1* | 3/2001 | Nakao ............... G06F 17/30719 707/999.003 |
| 6,493,663 | B1* | 12/2002 | Ueda .................... G06F 17/271 704/9 |
| 6,978,275 | B2 | 12/2005 | Castellanos et al. |
| 7,752,204 | B2 | 7/2010 | Kao et al. |
| 7,831,597 | B2 | 11/2010 | Wu et al. |
| 9,679,050 | B2* | 6/2017 | Duggal ................. G06F 17/211 |
| 2002/0099533 | A1 | 7/2002 | Jaqua |
| 2004/0236566 | A1 | 11/2004 | Simske |

(Continued)

OTHER PUBLICATIONS

David Duthrie, "Unsupervised Detection of Anomalous Text", Jul. 2008.

(Continued)

*Primary Examiner* — Abul K Azad
(74) *Attorney, Agent, or Firm* — HP Inc. Patent Department (57) ABSTRACT

Examples herein disclose multiple engines to produce output representative of a summary of document produced by each of the multiple engines. The examples apply a weighting mechanism to the output specific to that engine to obtain a value corresponding to that output. The examples identify specialized language if the value corresponding to that output reaches at least a particular threshold.

10 Claims, 5 Drawing Sheets

(56) References Cited

U.S. PATENT DOCUMENTS

| | | | |
|---|---|---|---|
| 2005/0203970 A1* | 9/2005 | McKeown | G06Q 10/10 |
| 2010/0114859 A1 | 5/2010 | Li et al. | |
| 2011/0153554 A1* | 6/2011 | Cohen | H04L 43/028 |
| | | | 707/607 |
| 2011/0264997 A1 | 10/2011 | Mukerjee et al. | |

OTHER PUBLICATIONS

Lincy Meera Mathews, et al "Intricacies of an Automatic Text Summarizer" Jun.-Jul. 2013.

* cited by examiner

| POS of Jargon (pct) → Summarizer Strategy ↓ | Proper Noun (.35) | Common Noun (.22) | Verb (.31) | Adjective (.12) | Overall Weight = Sum of the products of (POS pct)*(Relative Density) |
|---|---|---|---|---|---|
| All 3 Agree | 2.3 | 2.4 | 1.4 | 1.1 | 1.899 |
| Only 2 Agree | 3.5 | 2.3 | 1.8 | 1.7 | 2.493 |
| Only 1 | 2.6 | 2.5 | 2.8 | 1.5 | 2.508 |
| 1-2 Agree | 2.7 | 3.9 | 1.6 | 2.4 | 2.587 |
| None | 0.4 | 0.3 | 0.6 | 0.5 | 0.452 |
| 1 or 3 Agree | 2.4 | 2.4 | 2.2 | 1.3 | 2.206 |
| Best Approach | 3.5 | 3.9 | 2.8 | 2.4 | 3.239 |

SPECIALIZED LANGUAGE IDENTIFICATION

BACKGROUND

Specialized language is a word, text, phrase that may be that language easily understood by a particular group of people. Such examples of specialized language may include jargon, slang, figure of speech, euphemism, synecdoche, metonymy, etc.

BRIEF DESCRIPTION OF THE DRAWINGS

In the accompanying drawings, like numerals refer to like components or blocks. The following detailed description references the drawings, wherein:

FIG. 2B is a data chart of an example weighting mechanism by an identification engine, the weighting mechanism produces a value assigned to each output produced from the multiple engines to identify jargon, wherein jargon is considered consistent when output from the multiple engines are similar;

DETAILED DESCRIPTION

Specialized language may include terminology, such as word, phrase, etc. within a language which may be specific to a particular group of people. As such, this specialized language may be difficult for other outside of the particular group of people to understand. For instance, jargon is a special word, expression, or phrase that may be used by a particular profession or a particular group of people. As a result, jargon may be difficult for others outside of the particular profession or particular group of people to understand.

Identification of the specialized language, such as jargon in a document may be useful for accurately indexing the document and providing an understanding of the document. For example, accurately indexing the document provides a labeling mechanism to identify the other documents most salient to the document. In another example, identification of jargon and/or other specialized language provides a more robust context to the document thus providing a deeper understanding of the document. The terms specialized language and jargon may be used interchangeably throughout this application.

Approaches may identify different parts of text, such as verbs, nouns, etc.; however these approaches have minimal effectiveness when identifying specialized language and/or jargon. For example, these approaches may identify the various parts of the text, but may be unable to understand a context of how the part of speech is used in the document. For example, assume the word "donkey," is slang for a "bomb." The approaches recognize the terms "donkey," and "bomb," as common nouns but may be unable to recognize the term "donkey," may be slang for "bomb." As such, these approaches are ineffective at identifying jargon and other specialized language from the document.

To address these issues, examples disclosed herein provide an efficient mechanism to identify specialized language, such as jargon within a document. The examples disclose multiple engines which are each to produce output representative of a summary of the document. The output from each of the multiple engines is in general different. Providing the output representative of the summary of the document provides a context of the document for accurately identifying the specialized language, such as jargon. Additionally, providing output from each of the multiple engines is an effective approach to query each output for specialized language (e.g., jargon). Further, producing output representative of the summary of the document provides multiple queries of shorter length than the overall document for identification of the specialized language.

Additionally, the examples apply a weighting mechanism to each output produced by each of the multiple engines to obtain a weighted value corresponding to each output. Using, these values produced for each output, the examples identify specialized language from the output produced by each of the multiple engines if the value falls into the appropriate range for the engine. Obtaining the value corresponding to each output, terminology such as text and/or phrase may be evaluated within each output to determine how likely that terminology is jargon or other sort of specialized language.

Examples discussed herein provide an efficient mechanism to identify specialized language, such as jargon within a document. The examples produce output representative of a context of a document and evaluate each out nit to identify jargon and other sort of specialized language.

Figure 1:
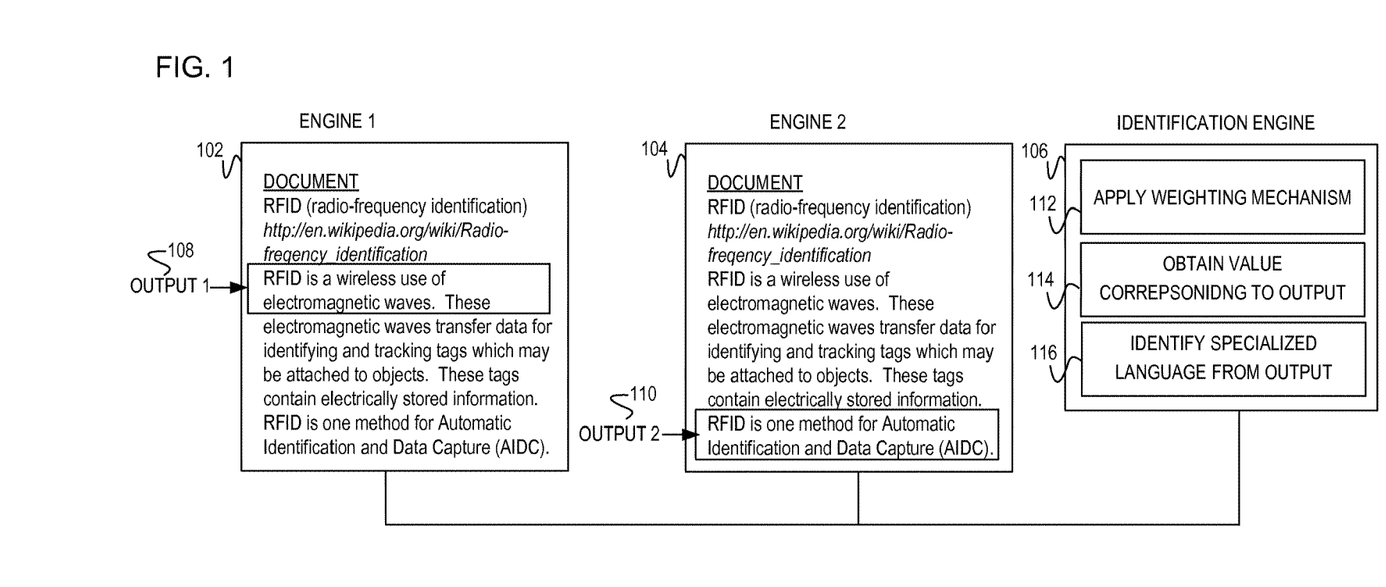
FIG. 1 is a block diagram of an example system including multiple engines to process a document for obtaining an output specific to each of the multiple engines, the system includes an identification engine to apply a weighting mechanism to the output for identifying specialized language from the output.

Referring now to the figures, FIG. 1 is a block diagram of an example system including multiple engines 102 and 104 for processing a document. The multiple engines 102 and 104 include a first engine 102 and a second engine 104 for processing the document to obtain output 108 and 110 specific to the particular engines 102 and 104. Obtaining output 108 and 110 specific to each engine 102 and 104 enables an identification engine 105 at modules 112-116 to apply a weighting mechanism to obtain a value corresponding to each output 108 and 110 for identifying specialized language such as jargon from the particular output 108 or 110. Although FIG. 1 illustrates two engines 102 and 104, implementations should not be limited as this was done for illustration purposes as the system may include more than two engines, etc.

The first engine 102 processes the document to obtain the output 108 (e.g., Output1) specific to the first engine 102 in such a manner that the first engine 102 serves a summarization engine to obtain the output 108. The output 108 produced by the first engine 102 includes content that is representative of the summary of the document, such that the output 108 is considered a relevant subset of text which describes a context of the document. In this manner, the output 108 produced by the first engine 102 is a subset of text shorter in length compared to the overall document. Producing the subset of shorter text, the first engine 102 transmits this output 108 to the identification engine 106 for efficient identification of jargon or other specialized language within the output 108. The output 108 produced by the first engine 102 depends on a type of the engine 102 which processes the document. For example, the first engine 102 may include an extractive type of engine, abstractive type of engine, and/or distributive type of engine. For example, FIG. 1 illustrates the situation of when the first engine 102 includes the extractive type engine. In this example, the extractive type engine pulls text directly from the document producing the subset of content as the output 108. In another example, the first engine 102 may include the abstractive type engine which processes the document to produce the output 108 in abstract terms, such as keywords. In a further example, the first engine 102 may include the distributive type of engine which looks at how often particular text appears within the document and pulls out that particular text which has the highest number of relative occurrences within the document. The first engine 102 may include a hardware component or a data structure executable by a processing resource (not illustrated) to obtain the output 102. As such implementations of the first engine 102 include, by way of example, an integrated circuit, application integrated circuit (ASIC), controller, processor, semiconductor, instruction, set of instructions, program, process, operation, technique, function, firmware, and/or software executable by the processing resource. For example, the first engine 102 may be implemented as a summarization technique implemented as an algorithm with a set of instructions executable by the processing resource.

The second engine 104 processes the document to obtain the output 110 (e.g., Output2) specific to the second engine 104 in such a manner that the second engine 104 serves a summarization engine to obtain the output 110. The output 110 is considered specific to the second engine 104 as the second engine 104 may include a different type of engine from the first engine 102 and/or process a different portion of the document from the first engine 102. For example, the first engine 102 may include the extractive type engine while the second engine 104 includes the abstractive type engine. In these examples, attributes may be specific to the engine including the type of engine and/or the portion of the document which is processed by each engine 102 and 104. Thus, the output 108 and 110 are each specific to the particular engine 102 and 104, accordingly. The second engine 104 may be similar in functionality to the first engine 102 and as such may include a hardware component or a data structure executable by the processing resource (not illustrated) to obtain the output 110. Implementations of the second engine 104 include, by way of example, an integrated circuit, application integrated circuit (ASIC), controller, processor, semiconductor, instruction, set of instructions, program, process, algorithm, operation, technique, function, firmware, and/or software executable by the processing resource.

The output 108 (e.g., Output1) is produced by the first engine 102 as the subset of content from the document. The output 108 represents the summary of content of the document and is specific to the first engine 102. As such, the output 108 is considered the relevant subset of text which describes the underlying context of the document. Additionally, the output 108 represents the content produced by the type of engine and/or from the portion of the document. Thus in this manner, the output 108 produced from the document is specific to the first engine 102. Implementations of the output 108 may include, by way of example, text, word(s), sentence(s), paragraph(s), etc. representing the summary of the document.

The output 110 (e.g., Output2) is produced by the second engine 104 as the subset of content from the document. The output 110 is specific to the second engine 104 and as such represents the content produced by the type of second engine 104 and/or from the portion of the document. In one implementation, the output 108 and 110 are combined to create a summarized output. In this implementation, content which may be overlapping between the multiple engines 102 and 104 is removed to produce a single output for mining jargon and other specialized language at the identification engine 106. In another implementation, if each of the multiple engines 102 and 104 select similar output 108 and 110, the specialized language usage is considered more consistent within the document. These implementations are discussed in detail in a later figure. The output 110 may be similar in functionality to the output 108 and as such implementations of the output 110 may include, by way of example, text, word(s), sentence(s), paragraph(s), etc. representing the summary of the document.

The identification engine 106 receives the output 108 and 110 from the multiple engines 102 and 104. Upon receiving the output 108 and 110, the identification engine 106 applies a meta-algorithmic approach as the weighting mechanism to obtain a value corresponding to each output for identifying jargon from each output at modules 112-116. In another implementation, the identification engine 106 combines the output 108 and 110 to generate the summarized output which is used for mining the specialized language, such as jargon. This implementation is discussed in detail in a later figure. Implementations of the identification engine 106 may be similar to the first engine 102 and the second engine 104, accordingly. As such, the identification engine 106 may include a hardware component and/or data structure executable by the processing resource (not illustrated). Implementations of the identification engine 106 include, by way of example, an integrated circuit, application integrated circuit (ASIC), controller, processor, semiconductor, instruction, set of instructions, program, process, algorithm, operation, technique, function, firmware, and/or software executable by the processing resource.

At modules 112-116, the identification engine 106 applies the weighting mechanism to each output 108 and 110 and obtains the value corresponding to each output. Obtaining values corresponding to each output, enables the identification engine 106 to identify jargon and/or other specialized language from each output. At module 112, the weighting mechanism applied to each output 108 and 110 may include applying the weighting mechanism to the content of each output 108 and 110, weighting each engine 102 and 104 specific to the output 108 and 110, and/or determining a relative density of each output 108 and 110 compared to the relative density of the overall document. These weighting mechanisms are discussed in detail in later figures. At module 114, upon applying the weighting mechanism to the output 108 and 110, the identification engine 106 obtains the value corresponding to the output 108 and 110. To obtain the value corresponding to the output 108 and 110, the identification engine parses terminology from the content of each output 108 and 110 to weight that terminology for comparison to the overall document. The terminology represents a word, sentence, phrase, etc. that may be included in each output 108 and 110. Thus at module 116, the identification engine 106 uses the value(s) to identify whether the terminology in that output 108 or 110 is more likely specialized language and/or jargon. For example, if the value relating to the terminology reaches at least the particular threshold, this indicates the likelihood that terminology is jargon. In another example, the identification engine 106 identifies the highest weighted values from the terminology in each output 108 and 110 to identify whether that terminology is jargon and/or specialized language. Implementations of the modules 112-116 include, by way of example, an instruction, set of instructions, process, operation, logic, technique, function, firmware, and/or software executable by the processing resource (not illustrated).

Figure 2A:
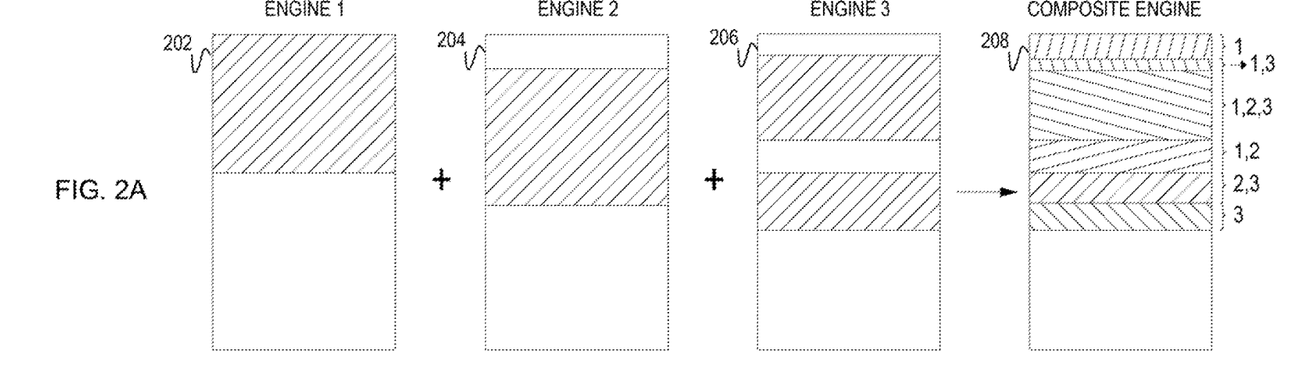
FIG. 2A is a block diagram of example multiple engines producing an output from a document for combining at a composite engine.

FIG. 2A is a block diagram of multiple engines 202, 204, and 206 processing a document to produce output specific to each of the multiple engines 202, 204, and 206 for combining the output at composite engine 208. In FIG. 2A it is assumed the document extends from the top to the bottom of each of the boxes representing the engines 202, 204, 206, and 208. As such, each shaded portion of the multiple engines 202, 204, and 206 represent the output as selected by that particular engine. For example, each of the multiple engines 202, 204, and 206 (Engine 1, Engine 2, and Engine 3) select a different set of content from the document to represent the output. Each different set of content representing the output represents a different view of the output summarizing the document. In this implementation, each of the multiple engines 202, 204, and 206 represent an extractive type of engine in which to produce the shaded output. In other applications, each engine 202, 204, and 206 produces a different set of content representing each output. The composite engine 208 combines the different sets of content into a filtered set of content. In this application, different combinations of the content produced by the engines 202, 204, and 204 create a different filtered set of content. The relative amount of specialized words (e.g., jargon) differs from each of the various combinations of content produced. Additionally, each set of content produced by each of the multiple engines 202, 204, and 206. For example, the combination of Engine 1 202 and Engine 3 206 produces a set of content with a density of specialized word usage different from the set of content produced by the combination of Engine 1 202 and Engine 2 204. It should be noted each of the multiple engines 202, 204, and 206 may further include abstractive type engines and/or distributive type of engine.

The composite engine 208 combines each shaded output produced by the multiple engines 202, 204, and 206 to illustrate various combination outputs of the multiple engines 202, 204, and 206. In one implementation, the multiple engines 202, 204, and 206 select overlapping content while in another implementation, each set of content produced by each of the multiple engines 202, 204, and 206 differ. For example, Engine 1 selected the top most portion of the document as the output while a combination of the multiple engines 202, 204, and 206 (Engine 1, Engine 2, and Engine 3) selected the various combinations of output. Each a the various content combinations as selected by the multiple engines 202, 204, and 206 are represented with a different line pattern to show the different output content combinations. As such, these combinations indicate different logical combinations of the output produced by each of the multiple engines 202, 204, and 206. These different sets of output combinations represent the different output that may be used for identifying, the specialized language, such as jargon from each output. The composite engine 208 provides various outputs for identifying the specialized language from each combinational output. Which of the various outputs combined at the composite engine 208 which may be more accurate in identifying depends on a type of jargon or type of specialized language the identification engine may be trying to identify. These types are illustrated in the table as in FIG. 2B.

Figure 2B:
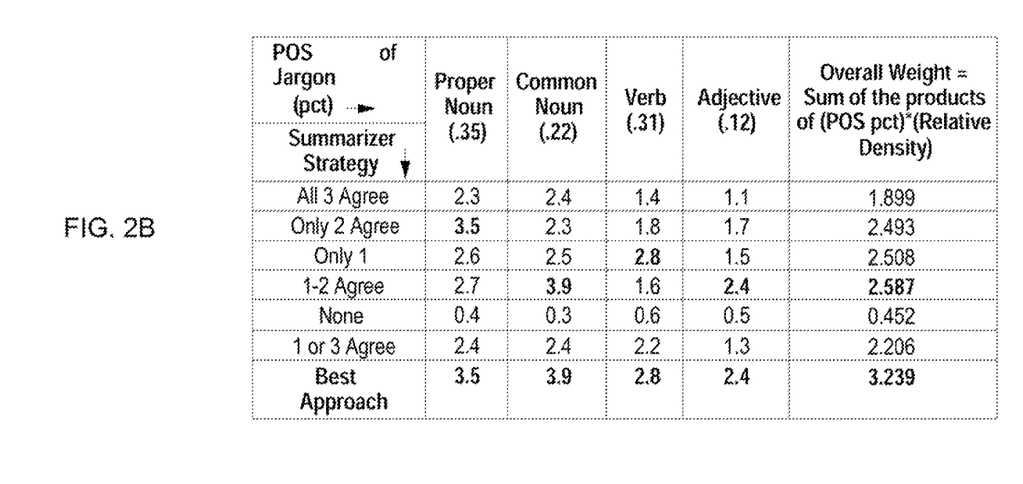

FIG. 2B is a data table of an example weighting mechanism applied to each combinational outputs as in FIG. 2A to produce a value for identifying specialized language within each combination output. Specifically, FIG. 2B represents an example of identifying jargon from different weighted values. The data table in FIG. 2B represents an example wherein multiple engines 202, 204, and 206 create sets of combination outputs as by the composite engine 208 to identify jargon within each of these combinational outputs. The relative, amount of jargon in combinational output differs for each combination of multiple engines 202, 204, and 206. In one such weighting mechanism example, the data table illustrates a relative density of a type of text such as word in a particular set of the combinational output from the composite engine 208 compared to a mean of the overall document or overall output combinations. As illustrated in the data table in FIG. 2B, a relative amount of jargon may be defined by its part of speech. For example, the percentage value assigned to jargon usage for different types of words are listed such as a proper noun, common noun, verb, adjective, etc. The example pans of speech indicating jargon in the data table include: verb as "chilling," for relaxing; proper noun as "Lincoln," for a five dollar bill; common noun is "spend," for budgeted cost; and an adjective as "choice," for desirable.

As illustrated in the data table, the weighting mechanism produces a value assigned to each output produced from the multiple engines 202, 204, and 206 to identify jargon, wherein jargon is considered consistent over the document when output from the multiple engines are similar or may overlap. For example, if the three engines 202, 204, and 206 select similar content as output, it may be assumed that jargon usage throughout the document is consistent. If for a majority of the text, the engines 202, 204, and 206 selects similar content as the output, then the text with disagreement highlights the portions of the output in which the multiple engines 202, 204, and 206 are not in agreement. If a single engine of the multiple engines 202, 204, or 206 selects the content as the output, it may be assumed that there may be some sort of jargon in the content in which that particular engine 202, 204, or 206 exclusively identifies. For example, if "Only 2 agree," approach identifies text with proper noun jargon with 3.5 times the density of the overall text input to each of the multiple engines 202, 204, and 206. In other examples the table shows: the "1-2 Agree," approach is most accurate at finding common noun jargon at 3.9 times the density of the overall text; the "Only 1," approach is most accurate at finding verb jargon at 2.8 times the density of the overall text; and the "1-2 Agree," approach is most accurate at finding adjective jargon at 2.4 times the density of the overall text. In these examples, the given approaches effectively concentrate jargon in the selected output portions. Concentrating jargon at its normal occurrence means that keywords within the concentrated text of the output are more likely to be actual jargon that keywords from the overall text.

Figure 3:
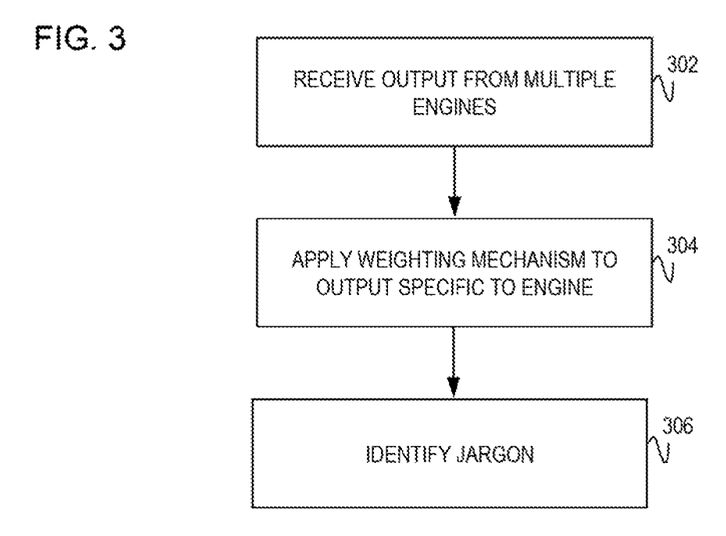
FIG. 3 is a flowchart of an example method, executable by a computing device, to receive output from multiple engines, apply a weighting mechanism to each output specific to that engine to obtain a value, and identify jargon if the value reaches at least a particular threshold.

FIG. 3 is a flowchart of an example method, executable by a computing device, to receive output from multiple engines. Each of the multiple engines processes a document to produce output representative of the document. This output may be a considered a subset of content from the document or abstractive text of the document. As such, the computing device applies a weighting mechanism to each output specific to each of the multiple engines to obtain a value. The value is used in turn to identify jargon and other specialized language which may be specific to each output. In this context, if the value reaches at least a particular threshold, this indicates text, phrase, or other type of terminology identified from the output is likely to indicate jargon and/or the specialized language. The method as outlined in FIG. 3 is executable by the computing device and as such implementations of the computing device include, by way of example, a processor, a controller, a processing unit, host processor, microprocessor, semiconductor, integrated circuit, embedded controller microcontroller, semiconductor, electronic device, microchip, chipset, or other type of electronic device capable of identifying specialized language from output produced by each engine. In discussing FIG. 3, references may be made to the components in FIGS. 1-2B to provide contextual examples. For example, the identification engine 106 as in FIG. 1 identifies the jargon and other specialized language based on values assigned to each output. Further, although FIG. 3 is described as implemented by the computing device, it may be executed on other suitable components. For example, FIG. 3 may be implemented in the form of executable instructions on a machine-readable storage medium 504 as in FIG. 5.

At operation 302, the computing device receives the output specific to each engine. Each of the multiple engines processes a document of content to produce the output representative of the document. The output is considered a relevant subset of text which describes the underlying context of the document. Additionally, the output representative of the document is produced by a type of the engine. In this example, the type of engine affects the results of the output representative of the document. As such, the engine may include an extractive type engine, abstractive type engine, and/or distributive type of engine. For example, the extractive type engine pulls text directly from the document producing the subset of content as the output. In another example, the abstractive type engine, pulls out text from the document which describes the document in abstract terms, such as keywords. In a further example, the distributive type engine looks at a probability of how often particular text and/or phrases occur within the document to pull out the terms with the highest probabilities of occurrence in the document. Thus in this manner, the type of output produced from the document is specific to the type of engine used. Each of the multiple engines produces the output at operation 302 as a subset of text of shorter length compared to the overall document. In this regard, the specialized language, such as jargon may be identified from the shorter subset of text, which most likely represents the most important part of the document, increasing the accuracy of specialized language and/or jargon detection.

At operation 304, the computing device applies the weighting mechanism to the output specific to each engine. The weighting mechanism provides an approach to assign a value to the output and as such weights the specific terminology within that output relative to the overall document processed at operation 302. For example, the weighting mechanism measures a relative density of the specific terminology in the particular output compared to the density of that specific terminology in the overall document. In one implementation, the weighting mechanism includes weighting the content within each output and weighting the engine from which that output was produced.

At operation 306, from each value obtained at operation 304, the computing device identifies the specialized languages, such as jargon. The weighting mechanism assigned at operation 304 weights the output from each of the multiple engines for identifying the jargon and/or other sort of specialized language. In this manner, terminology from the output of the document obtained at operation 302 is given a value to identify whether that particular terminology is the specialized language, such as jargon. For example, a text or phrase from the output may be given a particular value to identify the specialized language. In one implementation, if the value assigned to the terminology within the output at operation 304 reaches at least the particular threshold, this indicates that terminology may be jargon and/or other specialized language.

Figure 4:
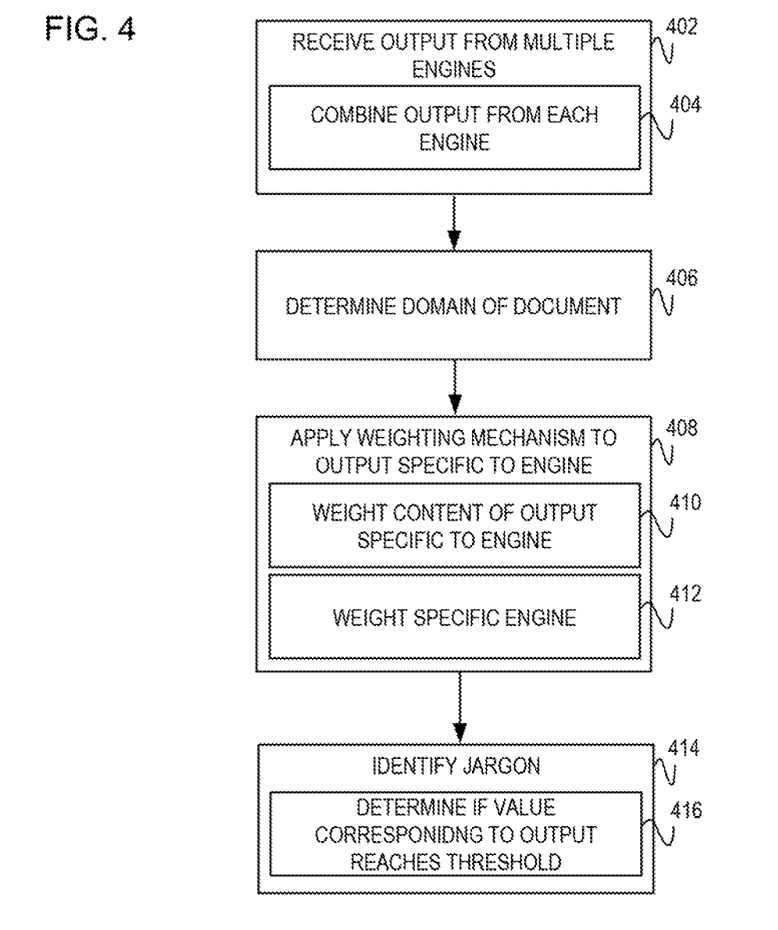
FIG. 4 is a flowchart of an example method, executable by a computing device, to receive output from multiple engines and combine the output into a summarized output the computing device applies a weighting mechanism to the summarized output by weighting content of the summarized output and weighting each specific engine to obtain a value for identifying jargon and or other specialized language usage within the summarized output.

FIG. 4 is a flowchart of an example method, executable by a computing device, to receive output from multiple engines, each output is specific to each engine. Each output is combined to generate a summarized output from the multiple engines. Additionally, the computing device determines a domain of the document prior to the summarized output. The domain of the document may be taken into consideration in applying a weighting mechanism to the summarized output or the output specific to each engine. The weighting mechanism may be applied to content of each output or summarized output and applied to each engine for obtaining a value. The value is obtained through a determination of relative density of text in the summarized output or each output. The relative density of the text in the particular output is weighed against an occurrence of the text in the overall document. Additionally, the value may also be obtained according to the value assigned to each specific engine. Obtaining the value from the weighting mechanism, the computing device may identify specialized language, such as jargon. As explained earlier, the specialized language is identified upon the obtainment of the value assigned according to the content within the output and/or the value assigned to each engine. Thus, if the value corresponding to the output reaches at least a particular threshold, this indicates the text within the output is more likely specialized language (e.g., jargon). In discussing FIG. 4, references may be made to the components in FIGS. 1-2B to provide contextual examples. For example, the identification engine 106 as in FIG. 1 identifies the specialized language based on values assigned to each output. Further, although FIG. 4 is described as implemented by the computing device, it may be executed on other suitable components. For example, FIG. 4 may be implemented in the form of executable instructions on a machine-readable storage medium 504 as in FIG. 5.

At operation 402, the computing device receives output from the multiple engines. In one implementation, each output produced by each engine is processed further to identify the specialized language such as jargon within the respective output at operation 414. In another implementation, each output from the multiple engines is combined to produce a summary of the output for identifying the specialized language within the summarized output at operation 414. Operation 402 may be similar in functionality to operation 302 as in FIG. 3.

At operation 404, the computing device combines each of the outputs produced from the multiple engines. Combining each of the outputs produced from the multiple engines may remove text which overlaps between the multiple engines. This reduces the size of the output which may be mined to identify the specialized language. In this manner, the output produced from each of the multiple engines is combined to a single output which is to represent the content from within the document and used to mine for the specialized language.

At operation 406, the computing device determines the domain of the document processed at operation 402. The domain of the document is a specified sphere of activity or knowledge. Determining the domain of the document, enables the computing device to proportionally weight those outputs and/or engines most relevant to the domain. For example, an abstractive type engine may be given more weight at operation 408 if the domain includes medical subjects. Thus different engines may be given more weight at operation 408 based on the different domains of documents. Although FIG. 4 illustrates operation 406 occurs post-processing of the document by each of the multiple engines, this was done for illustration purposes as operation may occur prior to processing of the document by each of the multiple engines.

At operation 408, the computing device applies the weighting mechanism to each output from the multiple engines or the summarized output obtained at operation 404. The weighting mechanism considers terminology within the output produced by each of the multiple engines or the summarized output. The terminology includes text and/or phrase of which the weighting mechanism may determine a relative density of the terminology in the output compared to the rest of the document. Applying the weighting mechanism to each output or the summarized output, provides the value for the specific terminology to identify whether that specific terminology is specialized language such as jargon as at operation 414. Operation 408 may be similar in functionality to operation 304 as in FIG. 3.

At operation 410, the computing device weights content of the output specific to each engine. Operation 410 may include using various weighting approaches to weighting content of each output. As such, the weighting approach may include using a non-parametric, parametric approach, and/or a weighting density approach for weighting content from each output. In the non-parametric weighting approach, the content in each output is ranked without a particular distribution within the output. For example, the non-parametric approach may weight a proper noun higher than a verb, etc. In this sense, the non-parametric approach may take into account a type of content. In the parametric weighting approach, attributes of the content are used to weight the content in each output. Such attributes may include length of the content, position of the content in the output, position of the content in the output, etc. For example, for a set of sentences, a sentence which occurs first may rank highest with a 0.95 weight while a second sentence may include a second ranking with a weight of around 0.55. In the weighting density approach, the content of the output may include terminology such as text and/or phrase in which the computing device determines a relative density of that terminology compared to the relative density of the overall text processed by the multiple engines.

At operation 412, the computing device weights each engine compared to the other engines as the weighting mechanism for the output. In implementations, the weight given to each engine may include a calculated confidence of each engine. In this implementation, the confidence in one engine may be given a heavier value than other engines. Additionally, the confidence may be calculated by checking the accuracy of each engine. The accuracy may be checked according to how well keywords overlap with the particular document. For example, for author generated keywords and/or on-line content an expert may generate for given content is compared to the document to determine how the accuracy of each engine and then weighting each engine, accordingly. In other implementations, the weight is assigned if one type of engine is more accurate for particular domain and thus weighted heavier than other types of engines. For example, an extractive type of engine may be weighted heavier than an abstractive engine when processing medical documents. Using the mechanism to weight each engine compared to other engines, enables the computing device to assign the value to the output specific to each engine. For example, the value assigned to the output may include the weight given to the specific engine is multiplied by the weight given to the specific terminology, such as phase, text, sentence, paragraph, etc. to obtain the value for identifying the specialized language at operation 414.

At operation 414, the computing device identifies the specialized language such as jargon based on the value(s) obtained at operation 408. In one implementation, the highest rank weighted value(s) obtained at operation 412 are identified as the specialized language. In another implementation, if the value(s) obtained at operation 412 that reaches at least the particular threshold indicates the specialized language as at operation 416. Operation 414 may be similar in functionality to operation 306 as in FIG. 3.

At operation 416, if the value obtained at operation 408 reaches a particular threshold, this indicates the terminology within the particular output is more likely specialized language.

Figure 5:
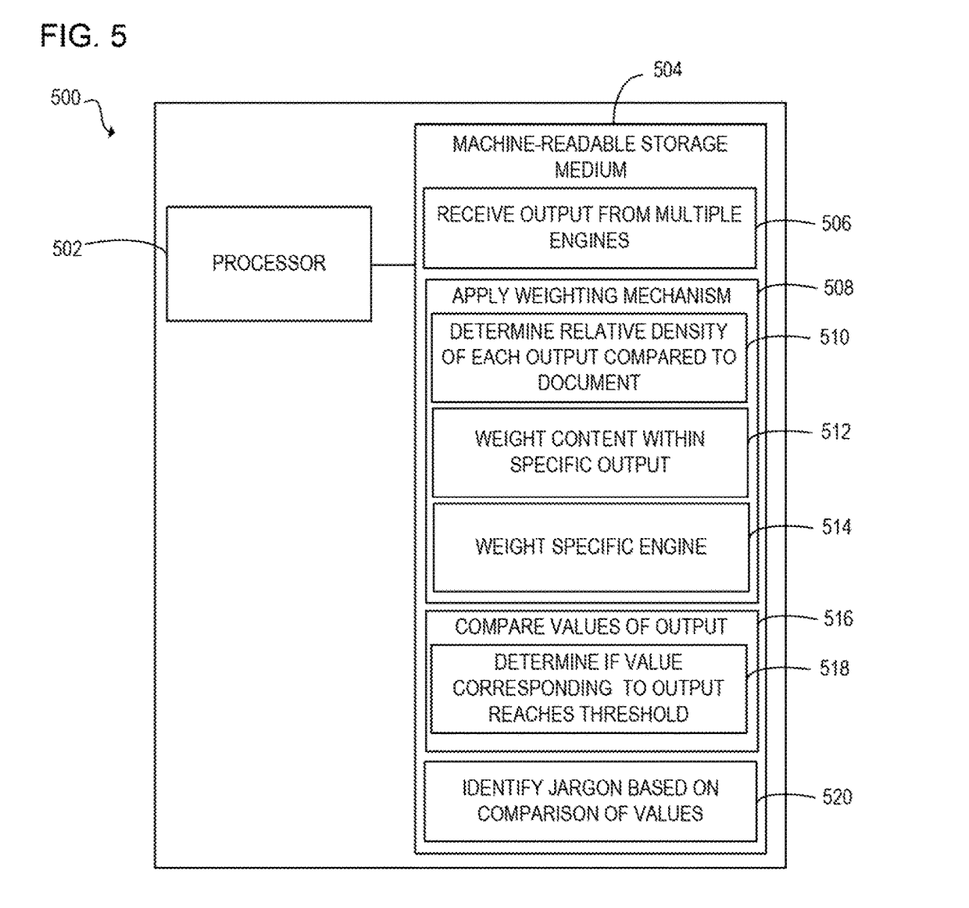
FIG. 5 is a block diagram of an example computing device with a processor to execute instructions in a machine-readable storage medium for identifying jargon based on values assigned to output specific to a particular engine.

FIG. 5 is a block diagram of computing device 500 with a processor 502 to execute instructions 506-520 within a machine-readable storage medium 504. Specifically, the computing device 500 with the processor 502 is to identify specialized language, such as jargon based on values obtained through a weighting mechanism to output from multiple engines. Although the computing device 500 includes processor 502 and machine-readable storage medium 504, it may also include other components that would be suitable to one skilled in the art. For example, the computing, device 500 may include at least one of the engines 102, 104, and 106 as in FIG. 1. The computing device 500 is an electronic device with the processor 502 capable of executing instructions 506-520, and as such embodiments of the computing device 500 include a mobile device, client device, personal computer, desktop computer, laptop, tablet, video game console, server, web service, or other type of electronic device capable of executing instructions 506-520. The instructions 506-520 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processor 502 may fetch, decode, and execute instructions 506-520 to identify specialized language, such as jargon from outputs produced by multiple engines. In one implementation, upon executing instruction 506, the processor 502 may execute instruction 508 through execution of instruction 510 or instructions 512-514. In another implementation, upon executing instructions 506-514, the processor 502 may proceed to execute instruction 516 through execution of instruction 518. Further, upon executing instructions 506-518, the processor 502 may proceed to execute instruction 520. Specifically, the processor 502 executes instructions 506-508 to: receive output from the multiple engines, the output is specific to each of the multiple engines; and applying the weighting mechanism to the output from the multiple engines. The processor 502 may execute instruction 508 through execution of either instruction 510 and/or instructions 512-514 to: determine a relative density of content in each output produced from each engine relative to the overall content in the document, producing a value for each output; weighting the content in each output from each of the multiple engines; and/or weighting each of the multiple engines relative to the other engines to obtain the value for each output produced from the multiple engines. The processor 502 may proceed to execute instructions 516-520 to: compare the values obtained by the weighting mechanism; determine if each of the values corresponding to each output reaches at least a particular threshold, thus indicating the specialized language within the output; and identify the specialized language based on the comparison of values assigned to each output based on the weighting mechanism.

The machine-readable storage medium 504 includes instructions 506-520 for the processor 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processor 502 to fetch, decode, and/or execute instructions of the machine-readable storage medium 504. The application and/or firmware may be stored on the machine-readable storage medium 504 and/or stored on another location of the computing device 500.

Examples discussed herein provide an efficient mechanism to identify specialized language, such as jargon within a document. The examples produce output representative of a context of a document and evaluate each output to identify jargon and other sort of specialized language.

We claim:

1. A system comprising:
    multiple engines that are each to produce output representative of a summary of the document, wherein each one of the multiple engines applies a different type of engine selected from a group of engines comprising an extractive type of engine, an abstractive type of engine, and a frequency type of engine, wherein the output from each of the multiple engines varies between the multiple engines in accordance with a respective type of engine;
    a composite engine to generate a filtered set of content in a single output to reduce a size of the output produced by the multiple engines, wherein the filtered set of content comprises different combinations of the output from the multiple engines that have different densities of specialized word usage;
    an identification engine to:
        apply a weighting mechanism to the different combinations of the output in the filtered set of content;
        obtain a value corresponding to the different combinations of the output in the filtered set of content;
        identify specialized language from the different combinations of the output in the filtered set of content, wherein the value corresponding to the different combinations of the output in the filtered set of content reaching at least a particular threshold indicates specialized language within that output; and
        index the document based on the specialized language that is identified to identify other documents salient to the document based on the specialized language.

2. The system of claim 1, wherein the identification engine is to apply the weighting mechanism to the output produced by each of the multiple engines to obtain the value includes determining a relative density of text in a particular output compared to a density of the text in the document.

3. A method comprising:
    receiving an output from multiple engines, wherein each engine of the multiple engines is to produce an output representative of a summary of a document specific to that engine based on a different type of engine selected from a group of engines comprising an extractive type of engine, an abstractive type of engine, and a frequency type of engine;
    generating a filtered set of content in a single output to reduce a size of the output produced by the multiple engines, wherein the filtered set of content comprises different combinations of the output from the multiple engines that have different densities of specialized word usage;
    applying a weighting mechanism to the different combinations of the output in the filtered set of content to obtain a value corresponding to each one of the different combinations of the output in the filtered set of content;
    identifying jargon when the value corresponding to the each one of the different combinations of the output in the filtered set of content reaches at least a particular threshold; and
    indexing the document based the jargon that is identified to identify other documents salient to the document based on the jargon.

4. The method of claim 3, wherein the multiple engines include multiple types of summarizer engines.

5. The method of claim 3, wherein the identifying the jargon is considered consistent when the output from the multiple engines is similar.

6. The method of claim 3, further comprising:
    determining a domain of the document prior to application of the weighting mechanism, wherein the domain affects a type of weighting mechanism for application to the output specific to that engine.

7. A non-transitory machine-readable storage medium comprising instructions that when executed by a processing resource cause a computing device to:
    receive an output from multiple engines, wherein each engine of the multiple engines is to produce an output representative of a summary of a document specific to that engine based on a different type of engine selected from a group of engines comprising an extractive type of engine, an abstractive type of engine, and a frequency type of engine;
    generate a filtered set of content in a single output to reduce a size of the output produced by the multiple engines, wherein the filtered set of content comprises different combinations of the output from the multiple engines that have different densities of specialized word usage;

apply a weighting mechanism to the different combinations of the output in the filtered set of content to obtain a value corresponding to each one of the different combinations of the output in the filtered set of content;

compare the values of the output from the multiple engines;

identify jargon based on the comparison of values; and index the document based the jargon that is identified to identify other documents salient to the document based on the jargon.

8. The non-transitory machine-readable storage medium of claim 7, wherein to identify the jargon based on the comparison of values comprises instructions that when executed by the processing resource causes the computing device to:

determine if the value corresponding to that output reaches at least a particular threshold.

9. The non-transitory machine-readable storage medium of claim 7, wherein to apply the weighting mechanism to the output specific to that engine to obtain the value corresponding to that output comprises instructions that when executed by the processing resource causes the computing device to:

determine a relative density of text in the output specific to the engine compared to a density of the text in the document.

10. The non-transitory machine-readable storage medium of claim 7, wherein the engine is to produce output representative of the summary of the document specific to the that engine wherein the output produced by that engine depends on a type of engine.

* * * * *

UNITED STATES PATENT AND TRADEMARK OFFICE
CERTIFICATE OF CORRECTION

PATENT NO. : 10,216,721 B2
APPLICATION NO. : 15/515933
DATED : February 26, 2019
INVENTOR(S) : Simske et al.

It is certified that error appears in the above-identified patent and that said Letters Patent is hereby corrected as shown below:

On the Title Page

In the illustrative figure, Ref. Numeral 416, Line 2, delete "CORREPSONIDNG" should read -- CORRESPONDING --.

In the Drawings

In sheet 1 of 5, reference numeral 114, Line 2, delete "CORREPSONIDNG" and insert -- CORRESPONDING --, therefor.

In sheet 4 of 5, reference numeral 416, Line 2, delete "CORRESPONIDNG" and insert -- CORRESPONDING --, therefor.

In the Claims

In Column 12, Line 39, Claim 3, after "based" insert -- on --.

In Column 13, Line 8, Claim 7, after "based" insert -- on --.

In Column 13, Line 28, Claim 10, after "to" delete "the".

Signed and Sealed this
Second Day of July, 2019

Andrei Iancu
*Director of the United States Patent and Trademark Office*